United States Patent Office 3,511,074
Patented May 12, 1970

3,511,074
WIRE BENDER
Silas Ray Crees, 1170 Sarno Road,
Eau Gallie, Fla. 32935
Filed May 9, 1968, Ser. No. 727,773
Int. Cl. B21d 7/00
U.S. Cl. 72—389                    6 Claims

ABSTRACT OF THE DISCLOSURE

A wire bending apparatus for bending electrical cable, or the like, in narrow confines such as panel boxes. A hydraulically actuated lever is fulcrumed on a frame and has a wire guide on one end thereof for bending an electrical cable placed across two rollers connected to the frame on either side of the wire guide.

BACKGROUND OF THE INVENTION

Field of the invention

The present invention relates to wire benders and more particularly to a hydraulic actuated electrical conductor bender adapted to bend an electrical conductor inside a panel box, junction box, switchboard, or the like.

In the electrical contracting work after panel boxes and the like, are installed and connected to conduit, or the like, the electrical wire or cable is pulled in place. When heavy conductors are used, a steel fish tape may be needed to draw the cable through the conduit. Conductors may also be pulled in using block and tackle or special machines including winches for pulling the cable tight. Once the cable is pulled into the junction box, panel box, or the like, it may be bent to the desired degree and into proper position, then cut to length for fastening to terminals within the box. When heavy cable is being used it becomes very difficult to bend it within a box, or the like, in narrow confines. This in turn results in damage to cable, wasted time and unsafe working conditions.

The present invention provides a wire bending apparatus having a frame and a lever connected to a fulcrum on the frame. A hydraulic cylinder is attached to the frame for applying force to one end of the lever. The other end of the lever has a shoe thereon and is adapted to bend a wire, or the like, when the hydraulic cylinder is actuated.

The frame has two rollers or guide shoes separated but parallel to each other for placing a wire, or the like, to be shaped. Actuation of the hydraulic cylinder applies force to one end of the lever while the other end of the lever applies a force to a wire, or the like, placed on the two separate rollers at a point between said rollers to bend the wire as desired. The apparatus is advantageously built to fit into panel boxes, junction boxes and other confined areas where work on heavy conductor cable presents the most troublesome problems. In addition the invention is small and lightweight for easy availability and carriage to a job site.

Description of the prior art

In the past various types of hickeys and benders have been used to bend thin-walled and rigid conduits. These benders are sometimes bench types and may be hydraulically operated to bend the conduit for installation. These devices, however, are not generally useful for bending the ends of heavy conductor cables for connection to various types of connectors. For instance, the benders are big, relatively bulky devices that cannot be used in tight quarters such as in working inside panel and junction boxes, and the like. These benders generally are made for inserting a piece of conduit prior to installation, then gripping it in some manner at one point and applying force to another point on the pipe to bend it around a curved guide having a predetermined radius to bend the pipe at a desired curvature which must be large enough to prevent coupling of the pipe at the bend.

Machines have also been suggested in the past for bending metal rails, beams, bars, and the like. One such machine is used in the manufacture of chain links and is of course bulky and for use only in a manufacturing plant. Another such device is used in the manufacture of springs and yet another such machine is used to bend rails as used in train tracks and other very heavy metal stock.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 1:
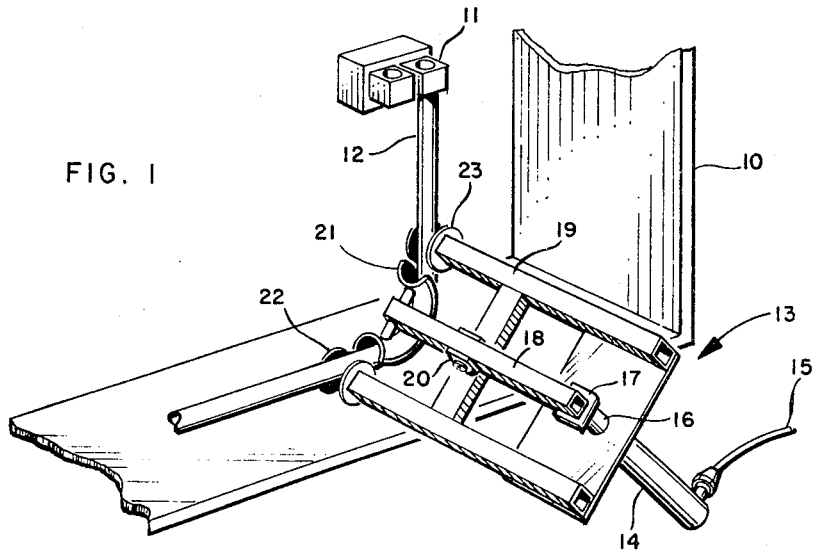
FIG. 1 is a cut-a-way perspective view of a panel box and an embodiment of the present invention bending a conductor.

FIG. 1 shows a perspective of a portion of a typical panel box 10 where the present invention might be used showing a connector 11 and cable 12 connected to the connector 11. An embodiment of the present invention is shown generally at 13 having a hydraulic cylinder 14 with an input line 15 and shaft 16, the shaft having a head 17 adapted to push against a lever 18. Lever 18 is fulcrumed on frame 19 at a point 20 at which point the lever is movably attached. The other end of the lever 18 is fitted with a shoe 21 which may be movably mounted to the lever 18. The hydraulic cylinder 14 is attached to the frame 19 which frame also has rollers 22 and 23 rotatably connected thereto. Rollers 22 and 23 are parallel to each other and located to either side of lever 18.

As can be seen my wire bending apparatus is well suited to fit into the panel box 10 and to be braced against the walls thereof for bending a heavy conductor 12. In operation the bender 13 has the wire 12 placed on rollers 22 and 23 and the hydraulic cylinder is activated to drive the lever 18 with its head 17. As the lever 18 is turned on its fulcrum 20 the shoe 21 is driven against the wire 12 and bends it for attachment to a connector 11. The bender 13 is then released from the cable 12 and placed for the next cable. In circumstances where it is not possible to brace the frame 19, I have found that a chain connected thereto with a clamp can be used for the proper support by clamping the clamp to the panel box walls.

Figure 2:
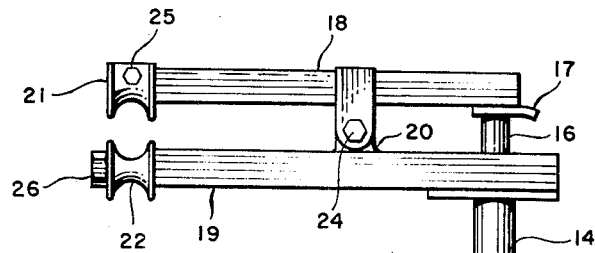
FIG. 2 is a side view of one embodiment of the present invention.

Turning now to FIG. 2, there can be seen a side view of the present invention having cylinder 14, hydraulic input 15, shaft 16 and head 17. Lever 18 is fulcrumed at a point 20 of frame 19 and about axis 24. It should be noted at this point that this fulcrum point can be located on frame 19 to give the desired amount of leverage on the lever and may be varied without departing from the spirit and scope of the present invention. On one end of lever 18 is located a shoe 21 movable about an axis 25. The frame 19 has rollers 22 and 23 (FIGS. 1 and 3) rotatably mounted about axes 26 and 27 (FIG. 3).

Figure 3:
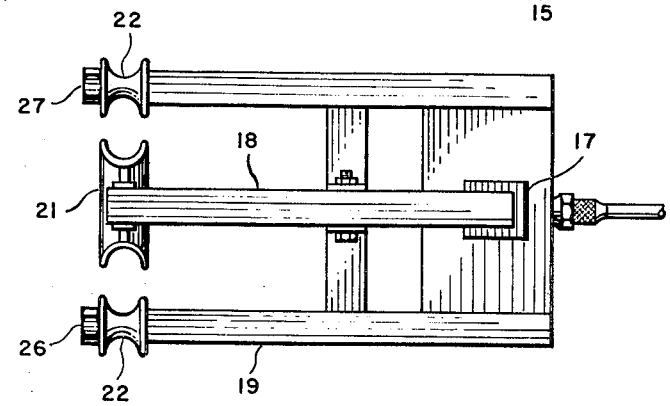
FIG. 3 is a top view of the embodiment of FIG. 2.

Referring to FIG. 3, there can be seen a top view of the invention having a frame 19, lever 18, rollers 22 and 23 and shoe 21. The head 17 can also be seen but not the cylinder 14. The head 17 could of course be connected to the lever 18 by a joint such as a rotatably connected bolt, ball joint, or the like, without departing from the spirit and scope of the invention.

From the foregoing description it will be clear that an apparatus has been provided for bending conductors, or the like, in very narrow working areas. The apparatus has a wide range of applications, some of which have been described but it is to be understood that other variations are contemplated as being within the spirit of the invention. One such variation might for instance use mechanical or pneumatic actuating means rather than a hydraulic means.

This invention is not to be construed as limited to the particular forms disclosed herein, since these are to be regarded as illustrative rather than restrictive.

I claim:

1. A wire bending apparatus comprising in combination:
   (a) a frame;
   (b) a lever having two end portions said lever being movably connected to a fulcrum on said frame;
   (c) actuating means connected to said frame and adapted to apply a force to one end portion of said lever;
   (d) said frame having two separated guide means rotatably attached to said frame;
   (e) said other end portion of said lever having a third guide means thereon; and
   (f) said third guide means being adapted to bend an object placed across said two separated guide means when said actuating means applies a force to said lever.

2. The wire bending apparatus according to claim 1 in which said actuating means is pneumatic.

3. The wire bending apparatus according to claim 1 in which said actuating means includes a hydraulic cylinder connected to said frame.

4. The wire bending apparatus according to claim 3 in which said third guide means is movably attached to said lever.

5. A wire bending apparatus according to claim 4 in which said third guide means is removably connected to said lever.

6. A wire bending apparatus according to claim 5, in which said third guide means includes a grooved arcuate shaped member for bending said object in a predetermined manner.

References Cited

UNITED STATES PATENTS

| | | | |
|---|---|---|---|
| 919,206 | 4/1909 | Newlin | 72—387 |
| 1,026,916 | 5/1912 | Johnson | 72—389 |
| 2,382,266 | 8/1945 | Simonsen | 72—389 |
| 2,998,838 | 9/1961 | Byrd | 72—389 |

CHARLES W. LANHAM, Primary Examiner

G. P. CROSBY, Assistant Examiner